(12) United States Patent
Schlansker et al.

(10) Patent No.: US 7,788,437 B2
(45) Date of Patent: Aug. 31, 2010

(54) COMPUTER SYSTEM WITH NETWORK INTERFACE RETRANSMIT

(75) Inventors: Michael S. Schlansker, Los Altos, CA (US); Boon Ang, Sunnyvale, CA (US); Erwin Oertli, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 916 days.

(21) Appl. No.: 11/553,970

(22) Filed: Oct. 27, 2006

(65) Prior Publication Data

US 2008/0162663 A1  Jul. 3, 2008

(51) Int. Cl.
*G06F 13/14* (2006.01)
*G06F 13/00* (2006.01)

(52) U.S. Cl. .................. 710/305; 710/22; 710/52; 709/250

(58) Field of Classification Search ............. 710/22–28, 710/52–57, 305–313; 709/250; 714/748–749
See application file for complete search history.

(56) References Cited

U.S. PATENT DOCUMENTS

| 5,548,796 | A | 8/1996 | Ketchum |
| 6,182,165 | B1 * | 1/2001 | Spilo ........................... 710/22 |
| 6,298,396 | B1 * | 10/2001 | Loyer et al. ................... 710/22 |
| 6,359,894 | B1 | 3/2002 | Hong et al. |
| 6,735,620 | B1 * | 5/2004 | Blackmore et al. .......... 709/212 |
| 6,981,014 | B2 | 12/2005 | Jayam et al. |
| 7,114,002 | B1 | 9/2006 | Okumura et al. |
| 7,551,638 | B2 * | 6/2009 | Trainin ....................... 370/429 |
| 7,624,263 | B1 * | 11/2009 | Viswanath et al. .......... 713/151 |

* cited by examiner

*Primary Examiner*—Christopher B Shin

(57) ABSTRACT

A computer system is provided including a computer having a bus coupled to a computer system memory with a user buffer allocated therein. A network interface controller is coupled between the bus and a network. A retransmit buffer is coupled to the computer system memory, a transmit/receive buffer coupled to the computer system memory, and a retransmit direct memory access is within the network interface controller for moving data between the user buffer and the transmit/receive buffer, the retransmit buffer, or both as well as for moving the data to the network.

20 Claims, 7 Drawing Sheets

COMPUTER SYSTEM WITH NETWORK INTERFACE RETRANSMIT

TECHNICAL FIELD

The present invention relates generally to computer systems coupled to a packet switched data network, and more particularly to a system for reducing application latency when communicating with the packet switched data network.

BACKGROUND ART

Network Interface Controllers or NIC's are communication devices that are used to send and receive messages from one node (computing system) to another node through a communication network. These NIC's reside in every computer system that accesses a network or the internet. NIC's may be found in laptop computers, wireless PDA's, Enterprise servers, or compute-intensive clustered processors, such as research computer clusters.

The advent of computer networking has given rise to a number of devices that connect computer systems to packet switched data networks, such as the Internet. These devices typically include interfaces to the computer system and the data network, as well as a buffer memory, for buffering packets of data in transit between the computer system and the data network. This buffer memory allows data to be downloaded from a host computer system when the host computer system is able to do so, and subsequently transmitted across the data network when the data network can accommodate a transmission, thereby increasing the overall efficiency of communications by the computer system across the data network.

There are typically two buffers in such a network interface device: a transmit buffer for storing data from the computer system to be transmitted onto the data network, and a receive buffer, for receiving data from the data network to be transmitted to the computer system. The transmit buffer and the receive buffer are typically resident in the system memory and are managed by a driver program that executes on the system processor based on interrupts from the NIC hardware. The data moves across a system bus in order to be stored in the system memory. Once the data is in system memory, the application that will manipulate the data is queued to take over the system processor execution.

During a transmit operation, the application program sending the data would store pointers, to the location of the data, in a register accessible by the NIC. The NIC would access the system bus first to retrieve the data pointers, then again to move the data into the NIC hardware for transmission. The application program and the data in system memory must wait until the data has been transferred through the network to a destination device and the destination has acknowledged receipt of the data. In the propagation through the network, errors may occur that prevent the delivery of the packet to the destination device. In this event an intermediate level software program, such as the Transfer Control Protocol/Internet Protocol (TCP/IP) will detect a timeout on the acknowledgement from the destination device. The NIC hardware would then once again access the system bus and move the data into the hardware for retransmission to the destination device.

The application program must wait for the successful transfer of the data to the destination device before it can use the system memory for other tasks. In the event of a heavily trafficked network or one susceptible to data loss due to switching anomalies, this operation can severely add to the latency of the application program and adversely impact system performance.

Thus, a need still remains for a computer system with network interface retransmit that can enhance the execution of application programs and overall system performance. In view of the ever increasing dependency on the internet for business and recreational applications, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to save costs, improve efficiencies and performance, and meet competitive pressures, adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

The present invention provides a computer system including a computer having a bus coupled to a computer system memory with a user buffer allocated therein. A network interface controller is coupled between the bus and a network. A retransmit buffer is coupled to the computer system memory, a transmit/receive buffer coupled to the computer system memory, and a retransmit direct memory access is within the network interface controller for moving data between the user buffer and the transmit/receive buffer, the retransmit buffer, or both as well as for moving the data to the network.

Certain embodiments of the invention have other aspects in addition to or in place of those mentioned above. The aspects will become apparent to those skilled in the art from a reading of the following detailed description when taken with reference to the accompanying drawings.

DETAILED DESCRIPTION

Figure 1:
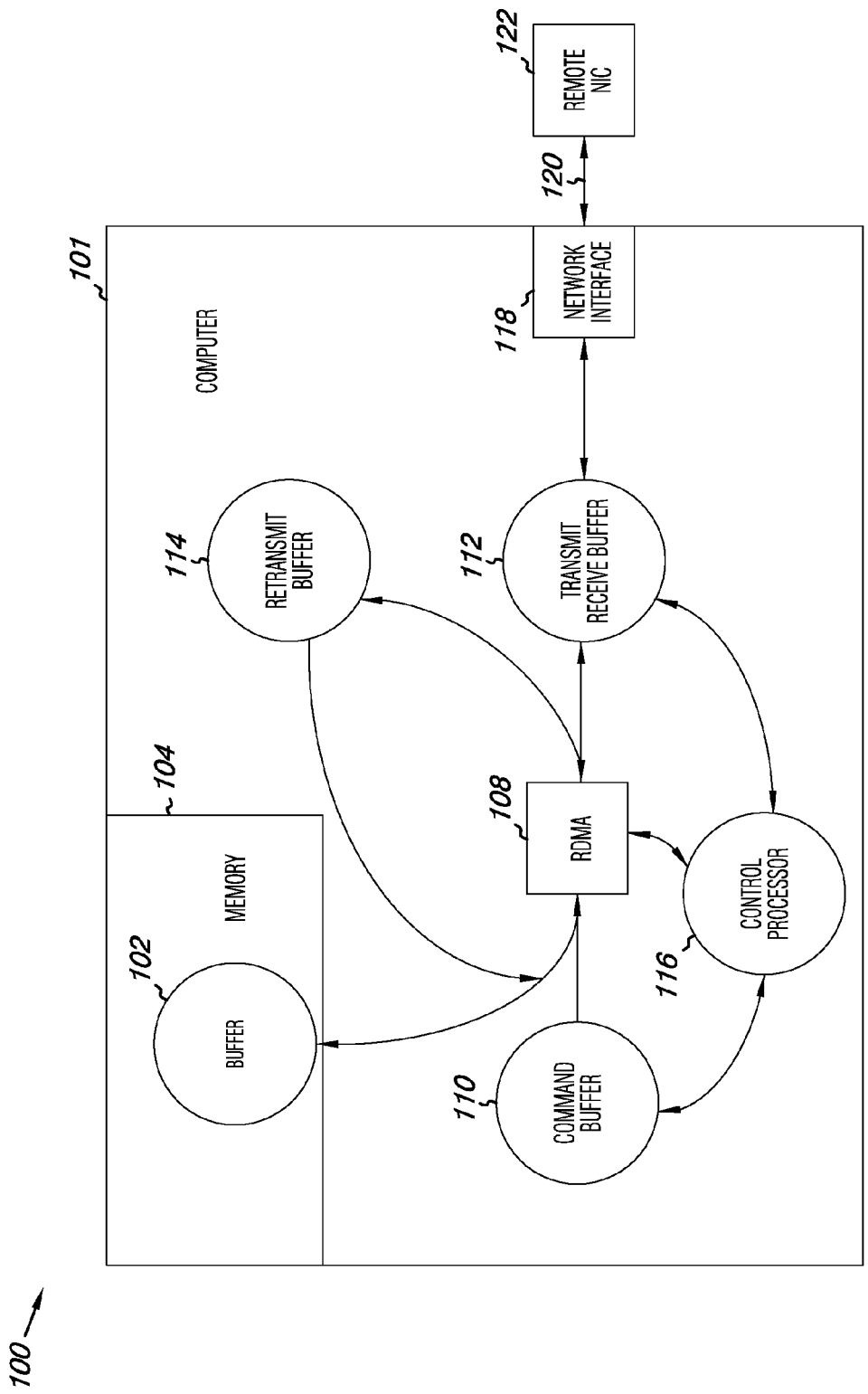
FIG. 1 is a functional block diagram of a computer system with network interface retransmit, in an embodiment of the present invention.

The following embodiments are described in sufficient detail to enable those skilled in the art to make and use the invention. It is to be understood that other embodiments would be evident based on the present disclosure, and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

Likewise, the drawings showing embodiments of the system are semi-diagrammatic and not to scale and, particularly, some of the dimensions are for the clarity of presentation and are shown greatly exaggerated in the drawing FIGs. Where multiple embodiments are disclosed and described, having some features in common, for clarity and ease of illustration, description, and comprehension thereof, similar and like features one to another will ordinarily be described with like reference numerals.

For expository purposes, the term "horizontal" as used herein is defined as a plane parallel to the plane or surface of the printed circuit board, regardless of its orientation. The term "vertical" refers to a direction perpendicular to the horizontal as just defined. Terms, such as "above", "below", "bottom", "top", "higher", "lower", "upper", "over", and "under", are defined with respect to the horizontal plane. The term "on" means there is direct contact among elements.

Referring now to FIG. 1, therein is shown a functional block diagram of a computer system 100 with network interface retransmit, in an embodiment of the present invention. The functional block diagram of the computer system 100 depicts a computer 101 having a user buffer 102 located in a computer system memory 104 coupled to a bus 106, such as a front side bus. The bus 106 is coupled to a retransmit direct memory access (RDMA) 108. The RDMA 108 is coupled to a command buffer 110, a transmit/receive buffer 112, a retransmit buffer 114 and a network interface control processor 116. The transmit/receive buffer 112 is coupled to a network interface 118 which is further coupled to a network 120, such as an Ethernet network.

If a user application wishes to transmit a message to a remote computer system coupled to the network 120, the message is assembled in the user buffer 102 within the computer system memory 104. An instruction is delivered to the RDMA 108 for service. The RDMA 108 copies the message to other locations for processing. With the aid of the network interface control processor 116, the command information, such as the address of a remote NIC 122, the allocated address in the transmit/receive buffer 112 and the allocated address in the retransmit buffer 114 is saved in the command buffer 110. The network interface control processor 116 aids in the moving of the message from the user buffer to the retransmit buffer performing the set-up of the RDMA 108, which includes loading the initial pointers for the user buffer 102, the transmit/receive buffer 112 and the retransmit buffer 114. The RDMA 108 copies the data content of the message to the transmit/receive buffer 112 and the retransmit buffer 114 in preparation for transmission to the remote NIC 122.

If an acknowledge message is not returned within a fixed time-out, the original message will have to be retransmitted. In prior art, the computer system 100 data would have to be transferred from the user buffer 102 once again. For this reason, the data in the user buffer 102 may be left for several seconds, which is an extremely long time in the computer system 100. In the computer system 100 of the present invention, the user buffer 102 may be released as soon as the data is transferred to the transmit/receive buffer 112, the retransmit buffer 114 and sent through the network interface 118. In the event of a message time-out, the network interface control processor 116 configures the RDMA 108 to send the retransmit message from the retransmit buffer 114, without seeking the data from the user buffer 102.

By releasing the user buffer 102 as soon as the message is transmitted, all of the latency associated with the network transfer to the remote NIC 122, the processing time of the remote NIC 122, the return network transfer time, and the local NIC receive process time, are removed from the operation. This allows an enhanced utilization of the user buffer 102 and better overall performance of the computer system 100.

The command buffer 110 holds pertinent information about all of the pending transfers. This information may include the address of the remote NIC 122, message sequence number, time-out, pending message status, retransmit buffer pointer and message length. The network interface control processor 116 utilizes the information in the command buffer 110 to configure the RDMA 108 and the network interface 118 for the retransmission of the message. For one embodiment of the invention, in the event of multiple time-outs for the remote NIC 122, all of the messages are re-transmitted in order starting with the oldest and a new time-out is stored, in the command buffer 110, for each of the retransmitted messages.

The above description is for example only and it is understood that the current invention may be implemented in a number of different approaches available to one of ordinary skill in the art, such as software, hardware, an integrated circuit, or a combination thereof.

Some parallel user applications utilize synchronous sends. A send is performed when the network interface control processor 116 invokes a function to send message data, specifies the location of the data, and specifies the message's destination address. The send is synchronous when a return from the network interface control processor 116 indicates that the source location in the transmit/receive buffer 112, from which data is sent, can be overwritten without disrupting the message or changing its value.

Asynchronous sends do not allow message data to be immediately overwritten after a return from the asynchronous send. Instead a separate wait operation must be invoked to ensure that input message data is no longer required before input data can be overwritten.

Many applications use synchronous sends because they are simpler than asynchronous sends. The present invention provides support for commonly executed synchronous send operations. In particular, the current invention provides a means to copy the message data, as it is being transmitted, and retransmission of the data if necessary. The synchronous sends can return quickly thus improving the speed of program execution. All necessary copying is performed while minimizing the number of times that data is moved across the bus 106.

Figure 2:
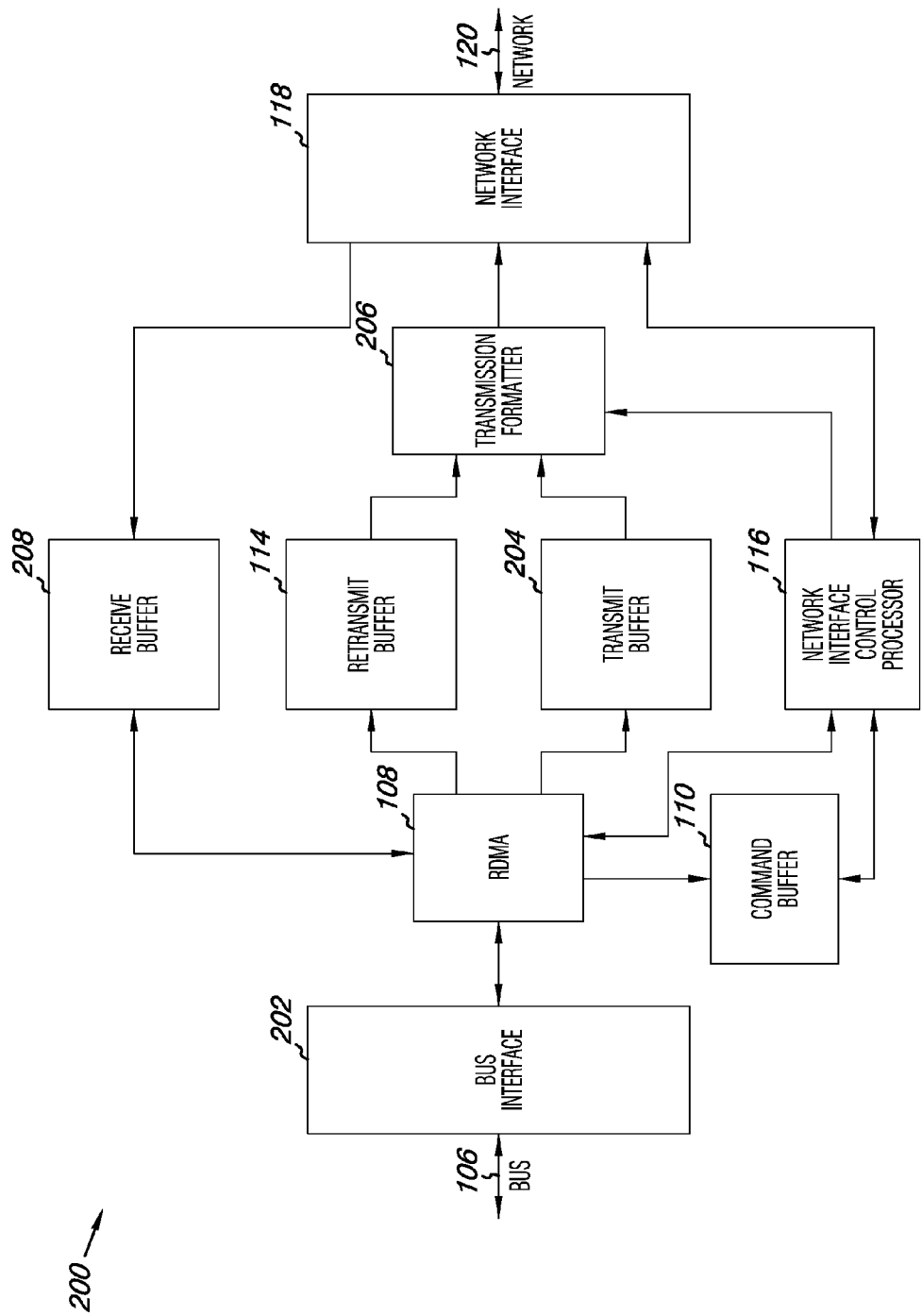
FIG. 2 is a functional block diagram of a network interface controller having a retransmit direct memory access, in an embodiment of the present invention.

Referring now to FIG. 2, therein is shown a functional block diagram of a network interface controller 200 having the RDMA 108, in an embodiment of the present invention. The functional block diagram of the network interface controller 200 depicts the bus 106 coupled to a bus interface 202, such as a front side bus (FSB) interface or a peripheral control interface (PCI). The bus interface 202 is coupled to the RDMA 108 to address the command buffer 110, a transmit buffer 204 and the retransmit buffer 114. A transmission formatter 206 is used to direct the output of either the transmit buffer 204 or the retransmit buffer 114 to the network interface 118 for transmission on the network 120. A receive buffer 208 is coupled between the network interface 118 and the RDMA 108.

The network interface control processor 116 coordinates the movement of data through the network interface controller 200. The bus interface 202 manages the protocol and timing for the bus 106. In one embodiment of the current invention, the bus interface 202 may support a front side bus. When a new message is to be sent to the remote NIC 122, the bus interface 202 moves the command information into the RDMA 108. The network interface control processor 116 coordinates the movement of the address of the remote NIC 122 into a free location in the command buffer 110. The allocated space in the command buffer 110 also holds the address pointers for the transmit buffer 204 and the retransmit buffer 114, a message sequence number, a transfer status, and other control information.

The transmission formatter 206 is configured to send the contents of the transmit buffer 204 to the network interface 118. The network interface control processor 116 loads the connection information into the network interface 118 and enables the transmission. When the transmit is completed, the network interface control processor 116 enables the RDMA 108 to release the user buffer 102. Once the user buffer 102 is released, the application that was sending the information is free to reuse the user buffer 102 for the next message.

If a message time-out occurs, the network interface control processor 116 looks up the information in the command buffer. The address of the remote NIC 122 and the message sequence number are loaded into the network interface, the retransmit buffer 114 address is loaded into the RDMA 108 and the transmission formatter 206 is configured for sending the contents of the retransmit buffer 114 to the network interface 118. The network interface control processor 116 then enables the network interface to execute the retransmission of the message. As a clean-up step the network interface control processor 116 calculates the new time-out value and stores it back in the command buffer 110 with the message status indicating retransmit and a count.

The functional block diagram of the network interface controller 200 depicts a direct communication between the bus interface 202 and the RDMA 108. This is by way of example and it is understood that there may be additional direct connection between them that is not shown. Data from the bus interface 202 may couple directly to the command buffer 110, the retransmit buffer 114, the transmit buffer 204 and the receive buffer 208. The addresses and timing control are supplied by the RDMA 108 in order to facilitate an embodiment of the present invention. The network interface controller 200 may be implemented as an integrated circuit and mounted on a printed circuit board within the computer system 100. Many of the control functions of the network interface controller such as those provided by the network interface control processor 116 may be implemented in software, hardware, integrated circuit, or a combination thereof.

Figure 3:
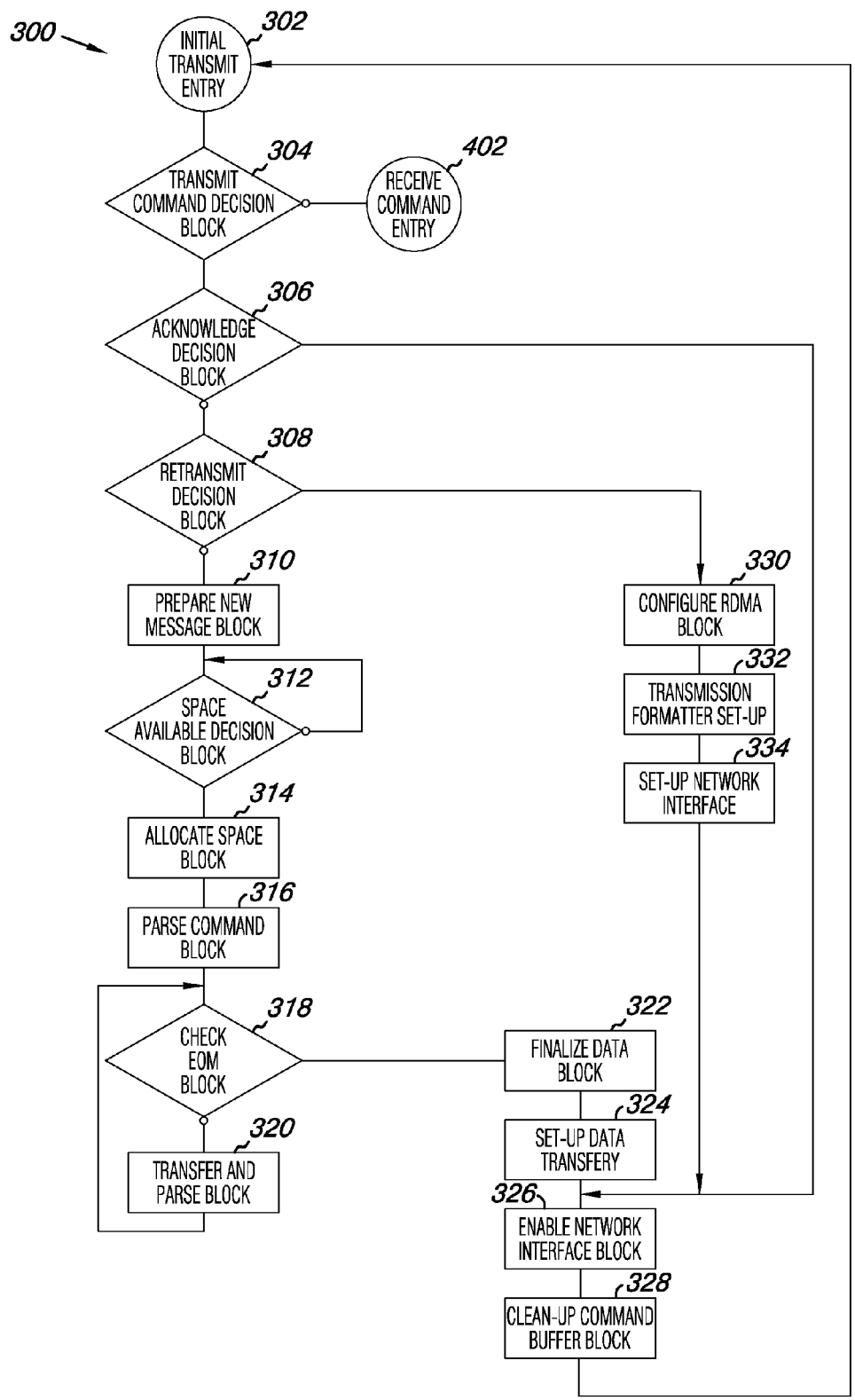
FIG. 3 is a flow chart of a transmit process of the network interface controller of FIG. 2.

Referring now to FIG. 3, therein is shown a flow chart of a transmit process 300 of the network interface controller of FIG. 2. The flow chart of the transmit process 300 depicts an "initial transmit entry" 302 coupled to a "transmit command decision block" 304. The "transmit command decision block" 304 checks for an active transmit command pending status. If nothing is pending the flow exits to a "receive command entry" 402 in order to check for a pending received message.

If a transmit command is pending an "acknowledge decision block" 306 checks to determine whether the transmit command is an acknowledge message or not. If an acknowledge message is pending the flow moves directly to an "enable network interface block" 326 to actually send the message that was configured during the receive process of the message data to which it is responding.

If the pending transmit command is not an acknowledge, a "retransmit decision block" 308 checks the pending transmit command for the retransmit status flag. This information is read from the command buffer 110, of FIG. 1, by the network interface control processor 116, of FIG. 1.

If a retransmit is pending, the flow progresses to a "configure RDMA block" 330. In the "configure RDMA block" 330, the network interface control processor 116, of FIG. 1, retrieves the pointer and message length for the command buffer 110, of FIG. 1, in order to set-up the retransmit side of the RDMA 108, of FIG. 1. Once the registers in the RDMA 108 are loaded, the flow progresses to a "transmission formatter set-up" 332. The "transmission formatter set-up" 332 configures the transmission formatter 206, of FIG. 2, to pass the retransmit data to the network interface 118, of FIG. 1. The flow then progresses to a "set-up network interface" 334, loads the destination address for the remote NIC 122 and the message sequence number of the original message. This completes the preparation for the retransmission of the message. The flow progresses to the "enable network interface block" 326 to send the retransmit message.

If a retransmit is not pending, in the "retransmit decision block" 308, the flow progresses to a "prepare new message block" 310. In the "prepare new message block" 310, the network interface control processor 116, of FIG. 1, retrieves a command header from the RDMA 108, in order to capture the destination address of the remote NIC 122 and the message length. The flow then progresses to a "space available decision block" 312.

The "space available decision block" 312 determines if there is sufficient space to manage the data message in the transmit buffer 204, of FIG. 2, and the retransmit buffer 114, of FIG. 1, and does not proceed until the space is found. When sufficient space is available, the flow progresses to an "allocate space block" 314.

In the "allocate space block" 314, the pointers and message length for both the transmit buffer 204, of FIG. 2, and the retransmit buffer 114, of FIG. 1, are written into the command buffer 110, of FIG. 1. The flow then progresses to a "parse command block" 316 in order to determine the data source and destination for the message data.

In the "parse command block" 316, the network interface control processor 116, of FIG. 1, retrieves a DMA command which contains a data source, a first data destination, a second data destination, and an end of message code. In some instances, the data may be scattered throughout the computer system memory 104, of FIG. 1. In order to collect the data in the appropriate buffers, a list of the data source, the first data destination, and the second data destination is repeated for as many segments as are required to collect the data.

In the DMA command format, the data source operand supplies the beginning address and length of the source data. The data source may be the user buffer 102, of FIG. 1, as defined by an application program, data distributed around the computer system memory 104, or data from within the retransmit buffer 114, of FIG. 1. The first data destination operand typically specifies the transmit buffer 204, of FIG. 2, which is within the network interface controller 200, of FIG. 2. The first data destination operand could indicate no operation, if the RDMA 108, of FIG. 1 is to be used to perform a memory copy of the source data. The second data destination operand may specify the retransmit buffer 114, of FIG. 1, or it could reference another location in the computer system memory 104, of FIG. 1. If the retransmit buffer 114 is specified, the system benefits from a reduced activity level on the bus 106, of FIG. 1.

In this case, in order to transmit data, the RDMA 108 reads source data from user buffer 102 across the bus 106 and then sends that data to both a transmit buffer 204 as well as a retransmit buffer 114. When this is accomplished, data passes across the bus 106 a single time. The RDMA 108 may perform this data copy in fixed-size units such as 64 byte cache lines. Thus, the RDMA 108 may read a sequence of source cache lines across the bus 106 and then may write each cache line to two destinations with no further transfer across the bus. Thus, the RDMA 108 may have only limited internal buffering such as 64 bytes. It is understood that the discussion of limited internal buffering is for example only and the actual size of the internal buffering is not limited by this description, but instead is established by the functional requirements of the computer system 100.

An alternative possibility that is available is to store the retransmit data in a buffer reserved within the computer system memory 104. This solution provides a less expensive hardware set, but adds congestion to the bus 106, of FIG. 1. In this case, in order to transmit data, RDMA 108 reads source data from user buffer 102 across the bus 106 and then sends that data to both a transmit buffer 204 as well as a retransmit buffer 114. When this is accomplished, data has passed across the bus 106 only twice. Once to acquire needed source data and once to store that data within the retransmit buffer 114 located in system memory 104. The RDMA 108 may perform this data copy in fixed-size units such as 64 byte cache lines. Thus, the RDMA may read a source cache line through the bus and then may write a cache line to two destinations with only a single additional transfer across the bus that needed to access retransmit buffer 114. The RDMA 108 may have only limited internal buffering. When transferring from a source to an unaligned target within retransmit buffer 114, RDMA 108 buffering could be limited, for example, to at most 128 bytes. In this case, the RDMA 108 reads a sequence of cache lines from user buffer 102 and writes a portion of each cache line as well as a portion of the previous cache line to efficiently move an arbitrarily aligned cache line of data to retransmit buffer 114.

Additional sets of the data source, the first data destination, and the second data destination may be concatenated in the DMA command. The network interface control processor 116, of FIG. 1, will continue to parse the DMA command until an "end of message" (EOM) is detected. The data from each source will be transferred to the appropriate destination addresses during the execution of the data move.

After the first set, of source and destinations, has been parsed the flow progresses to a "check EOM block" 318. If an EOM is not detected, the flow moves to a "transfer and parse block" 320. The "transfer and parse block" 320 moves the first segment of data and parses the next set of source and destinations in the DMA command. When the RDMA 108 is set-up to move the next segment of data, the flow progresses back to the "check EOM block" 318. The flow will stay in this loop until an EOM is detected in the DMA command. Upon detecting the EOM in the DMA command, the flow progresses to a "finalize data block" 322. In the "finalize data block" 322, the last segment of data associated with the DMA command is moved to the destination. And the flow moves to a "set-up data transfer" 324. In the "set-up data transfer" 324, the destination address of the remote NIC 122 and sequence numbers are loaded into the network interface 118, of FIG. 1, and the transmission formatter 206 is configured for moving data from the transmit buffer 204, of FIG. 2, to the network interface 118, of FIG. 1.

The flow then progresses to the "enable network interface block" 326 to actually send the transmit message. Once the data has been sent, the flow progresses to a "clean-up command buffer block" 328. In the "clean-up command buffer block" 328, the message status and updated sequence number are loaded into the command buffer 110, of FIG. 1, in order to release the data in the user buffer 102, of FIG. 1. The flow then returns to the "initial transmit entry" 302.

Figure 4:
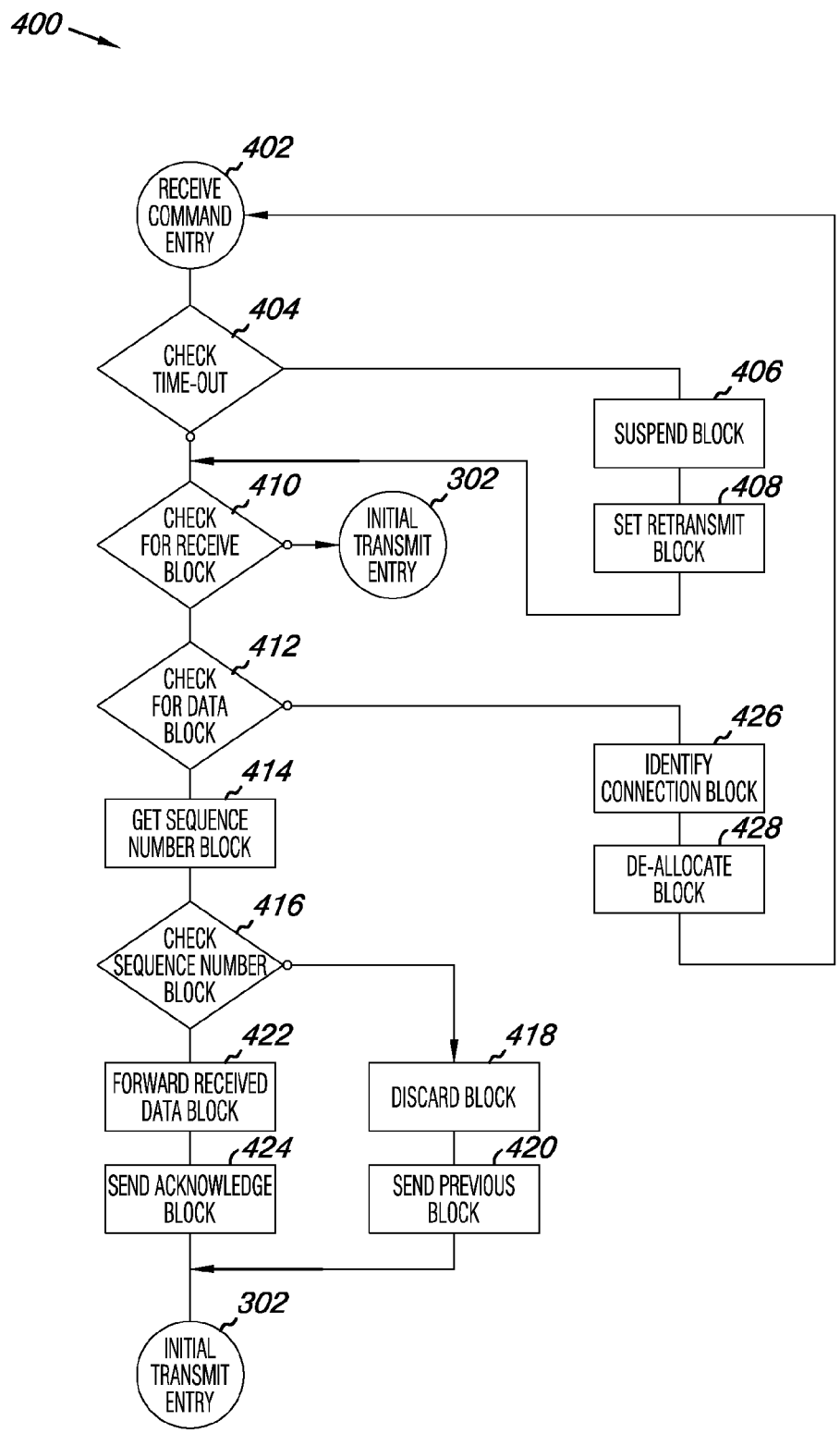
FIG. 4 is a flow chart of a receive process of the network interface controller of FIG. 2.

Referring now to FIG. 4, therein is shown a flow chart of a receive process 400 of the network interface controller 200, of FIG. 2. The flow chart of the receive process 400 depicts the "receive command entry" 402 coupled to a "check time-out" 404. In the "check time-out" 404, the network interface control processor 116, of FIG. 1, checks the command buffer 110, of FIG. 1, for any message sequence that has timed-out. If a time-out is detected, the flow moves to a "suspend block" 406, where the network interface control processor 116, of FIG. 1, sets a flag to suspend any new messages to the remote NIC 122 identified in the timed-out message. The flow then progresses to a "set retransmit block" 408, in which the network interface control processor 116, of FIG. 1, sets a retransmit bit in the command buffer 110, of FIG. 1, indicating that the timed-out message is to be retransmitted at the next opportunity.

The flow then moves to a "check for receive block" 410, in which the network interface control processor 116, of FIG. 1, checks for a received command pending. If no receive command is pending the flow moves to the "initial transmit entry" 302 to check for a transmit command. If a receive command is pending, the flow moves to a "check for data block" 412. If a data message has been received, the flow moves to a "get sequence number block" 414. The network interface control processor 116, of FIG. 1, retrieves the address of the remote NIC 122 and the sequence number from the message. The flow then moves to a "check sequence number block" 416.

In the "check sequence number block" 416, the network interface control processor 116, verifies that the message has a valid sequence number for the remote NIC 122. The remote NIC 122 address within the message is used to identify the connection status for the arriving message. The network interface control processor 116 reads the previous sequence number, for that connection, from the command buffer 110, of FIG. 1, and increments the sequence number by one in order to generate the expected sequence number. If the sequence number in the message is not a match for the expected sequence number, the flow moves to a "discard block" 418 and the incoming message is discarded. All of the memory pointers are restored to the values they had prior to the arrival of the errant message. The flow then progresses to a "send previous block" 420.

The "send previous block" 420 assembles an acknowledge message in response to the message that was discarded. The acknowledge message is addressed to the remote NIC 122 that sent the discarded message. It contains the address of the network interface controller 200, of FIG. 2, and the sequence number of the last valid message received, within an unbroken sequence of prior valid messages, from the remote NIC 122. The network interface control processor 116 sets a send acknowledge flag then the flow progresses to the "initial transmit entry" 302 for further processing.

If the incoming message has a valid sequence number, meaning that it is the expected next message in sequence, the flow progresses to a "forward received data block" 422. In the "forward received data block" 422 the network interface control processor 116 utilizes the RDMA 108, of FIG. 1, to copy the data from the receive buffer 208, of FIG. 2, to the user buffer 102, of FIG. 1, in the computer system memory 104, of FIG. 1. The flow then progresses to a "send acknowledge block" 424.

In the "send acknowledge block" 424 the network interface control processor 116 prepares to send the acknowledge message for the data message just received. The network interface control processor 116 loads a set of registers that will be used to set-up the network interface 118, of FIG. 1, during the transmit process 300, of FIG. 3. The registers will contain the sequence number of the message just received, the remote NIC 122 address and the address of the network interface controller 200, that is sending the acknowledge message.

If the "check for data block" 412 did not find a data message the flow progresses to an "identify connection block" 426. In the "identify connection block" 426 the network interface control processor 116 utilizes the remote NIC 122 address in the acknowledge message to identify the pending messages stored in the retransmit buffer 114, of FIG. 1. The sequence number is used to identify the message that is being acknowledged as well as any earlier messages for that connection. All of these messages have been successfully received. The flow then progresses to a "de-allocate block" 428. In the "de-allocate block" 428, the acknowledged message and any earlier messages for that connection in the retransmit buffer 114 are de-allocated. The command buffer 110 is updated to indicate the locations referencing the de-allocated messages are now available for new messages. The flow then progresses to the "receive command entry" 402 for further processing.

Figure 5:
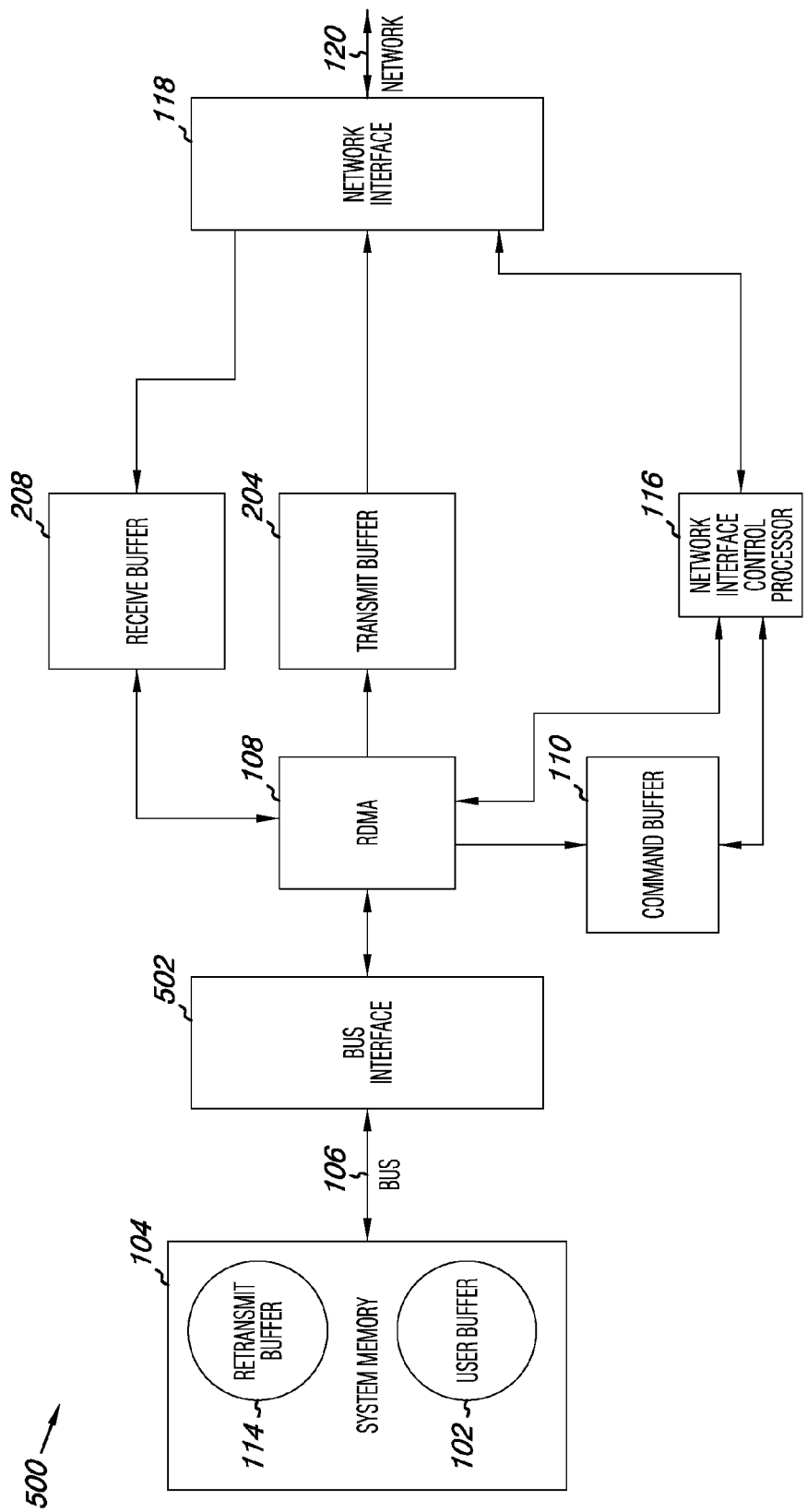
FIG. 5 is a functional block diagram of the network interface controller having a retransmit direct memory access, in an alternative embodiment of the present invention.

Referring now to FIG. 5, therein is shown a functional block diagram of a network interface controller 500 having the RDMA 108, in an alternative embodiment of the present invention. The functional block diagram of the network interface controller 500 depicts a bus interface 502 coupled to the bus 106 and the RDMA 108 to address the command buffer 110, the transmit buffer 204, the retransmit buffer 114 and the receive buffer 208. The receive buffer 208 is coupled between the network interface 118 and the RDMA 108.

In this alternative embodiment of the computer system 100 with network interface retransmit, the retransmit buffer 114 may be located within the computer system memory 104. This embodiment represents a simplified hardware solution, but it adds additional activity to the bus 106. The bus interface 502 may retrieve data from the user buffer 102, to be stored in the transmit buffer 204 and the retransmit buffer 114 located in the computer system memory 104. All of the data movement is managed by the RDMA 108.

The network interface control processor 116 coordinates the movement of data through the network interface controller 500. The bus interface 502 manages the protocol and timing for the bus 106. In one embodiment of the current invention, the bus interface 502 may support a front side bus (FSB) or a peripheral control interface (PCI). When a new message is to be sent to the remote NIC 122, the bus interface 502 moves the command information into the RDMA 108. The network interface control processor 116 coordinates the movement of the remote NIC 122 address into a free location in the command buffer 110. The allocated space in the command buffer 110 also holds the address pointers for the transmit buffer 204 and the retransmit buffer 114, message sequence numbers, transfer status, and other control information.

The network interface control processor 116 loads the connection information into the network interface 118 and enables the transmission. When the transmit is completed, the network interface control processor 116 enables the RDMA 108 to release the user buffer 102. Once the user buffer 102 is released, the application that was sending the information is free to reuse the user buffer 102 for the next message. In prior art computer systems, the user buffer 102 could not be released until the network interface controller 500 had received an acknowledgement of the message received by the remote NIC 122.

If a message time-out occurs, the network interface control processor 116 looks up the information in the command buffer. The remote NIC 122 address and the message sequence number are loaded into the network interface 118, the retransmit buffer 114, address is loaded into the RDMA 108 and the transmission formatter 206 is configured for sending the contents of the retransmit buffer 114 to the network interface 118 which is further coupled to the network 120, such as an Ethernet network. The network interface control processor 116 then enables the network interface to execute the retransmission of the message. As a clean-up step the network interface control processor 116 calculates the new time-out value and stores it back in the command buffer 110 with the message status indicating retransmit, the current sequence number, and a count.

The functional block diagram of the network interface controller 500 depicts a direct communication between the bus interface 502 and the RDMA 108. This is by way of example and it is understood that there may be additional direct connection between them that is not shown. Data from the bus interface 502 may couple directly to the command buffer 110, the transmit buffer 204 and the receive buffer 208. The addresses and timing control are supplied by the RDMA 108 in order to facilitate an embodiment of the present invention.

Figure 6:
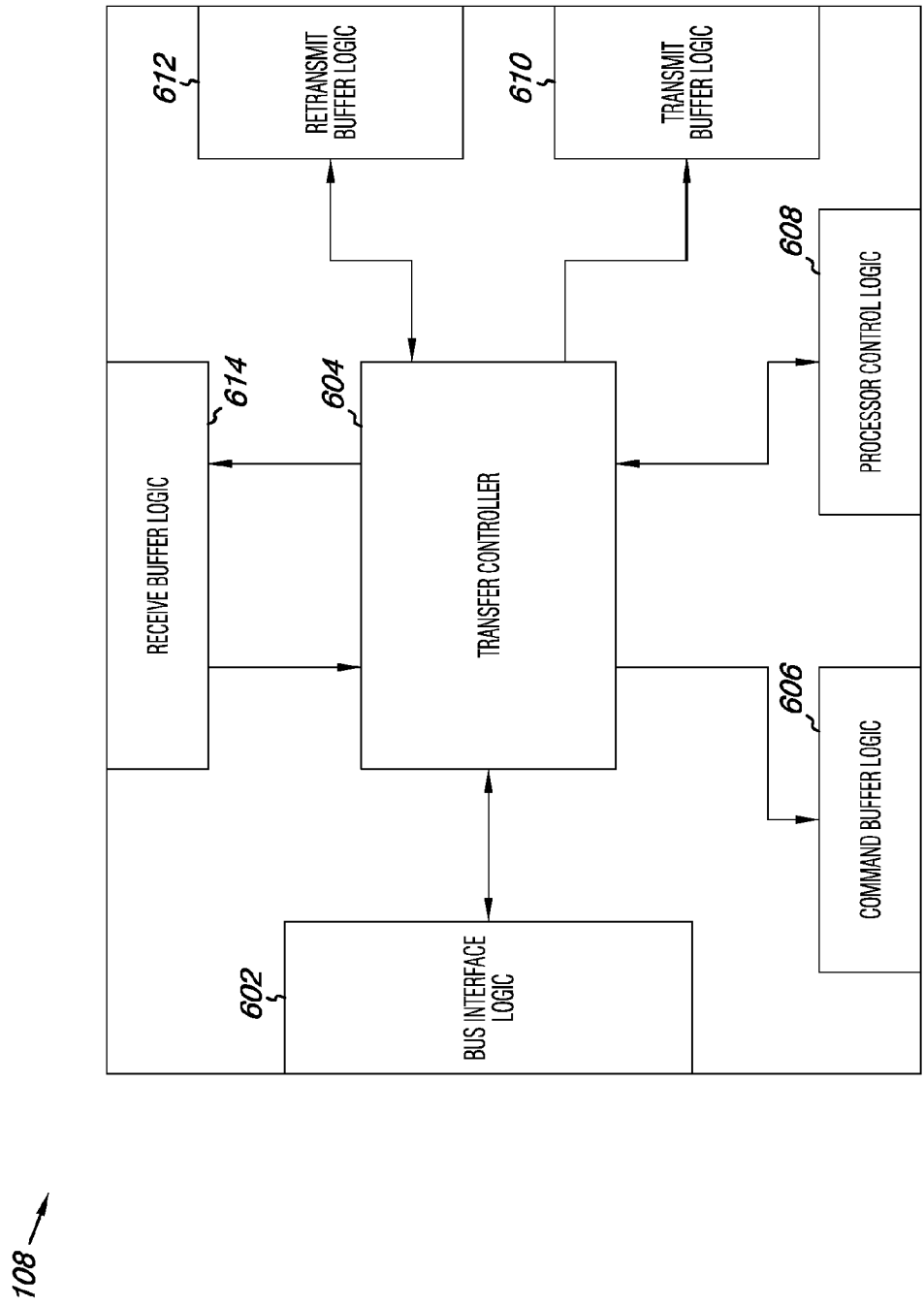
FIG. 6 is a functional block diagram of the retransmit direct memory access, in an embodiment of the present invention.

Referring now to FIG. 6, therein is shown a functional block diagram of the RDMA 108, in an embodiment of the present invention. The functional block diagram of the RDMA 108 depicts a bus interface logic 602 coupled to a transfer controller 604. The transfer controller 604 may manage the timing and address of storage functions within or under control of the network interface controller 200. While the transfer controller 604 is receiving message control information from the bus interface logic, it may activate a command buffer logic 606, having address and control lines, to write that information into the command buffer 110, of FIG. 1. A processor control logic 608 may be used to establish working conditions for the transfer controller 604, such as the base address of the retransmit buffer 114, of FIG. 1, address pointers for accessing messages in the retransmit buffer 114, the receive buffer 208, of FIG. 2, or the command buffer 110, of FIG. 1.

A transmit buffer logic 610 provides the address and control lines to store information in the transmit buffer 204, of FIG. 2. The transmit buffer logic 610 also manages the data presented to the network interface 118, of FIG. 1, during transmission of a message. A retransmit buffer logic 612 controls the access to the retransmit buffer 114, of FIG. 1. The retransmit buffer 114 may be a memory within the network interface controller 200, of FIG. 2, or it may reside within the computer system memory 104, of FIG. 1. The registers in the retransmit buffer logic 612 may be written or read by the transfer controller 604. If the retransmit buffer 114 is located in the computer system memory 104, the addresses for accessing the retransmit buffer 114 are presented through the bus interface logic 602.

A receive buffer logic 614 manages the input addresses from the network interface 118, of FIG. 1, and the output addresses for transfer of the message data to the bus interface 202, of FIG. 2. These address pointers are independent and the receive buffer may be read and written in a concurrent operation of the network interface 118 and the bus interface 202.

Figure 7:
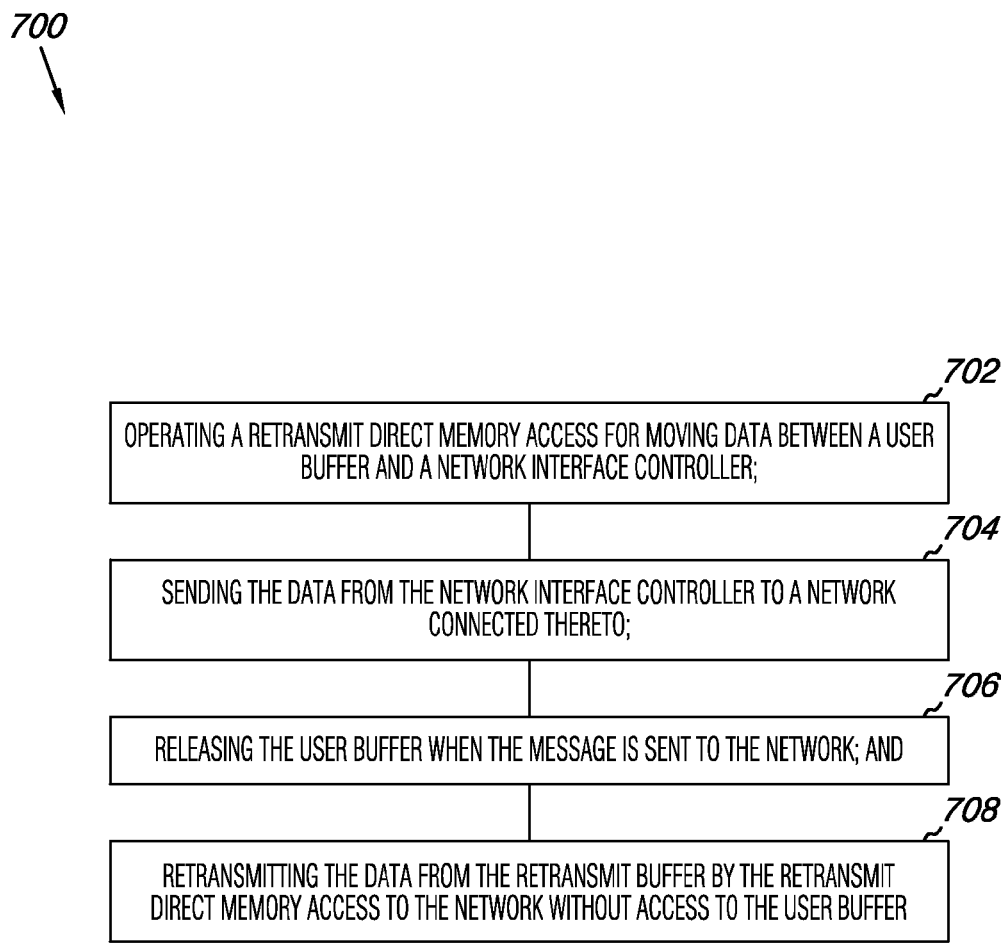
FIG. 7 is a flow chart of a method for controlling retransmission of messages at a network interface in accordance with an embodiment of the present invention.

Referring now to FIG. 7, therein is shown a flow chart of a method for controlling retransmission of messages at a network interface for use in a computer system 700 with network interface retransmit in an embodiment of the present invention. The system 700 includes operating 702 a retransmit direct memory access 108 for moving data between a user buffer 102 and a network interface controller 200 in a block 702; sending 704 the data from the network interface controller 200 to a network 120 connected thereto in a block 704; releasing 706 the user buffer 102 when the message is sent to the network 120 in a block 706; and retransmitting the data from the retransmit buffer 114 by the retransmit direct memory access 108 to the network 120 without access to the user buffer 102 in a block 708.

In one aspect, the present invention may reduce operational latency when an application transfers data to a network destination while also reducing the activity on the bus coupled to the computer system memory.

In another aspect, the present invention will reduce application latency when connected to either the front side bus or the peripheral control interface.

Another aspect is the present invention is scaleable for low cost or high performance while reducing the latency in all configurations.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method for operating a computer system comprising:
   operating a retransmit direct memory access for moving data between a user buffer and a network interface controller, wherein the retransmit direct memory access copies the data from a user buffer to a retransmit buffer and a transmit/receive buffer;
   releasing the user buffer when the data is copied to the transmit/receive buffer;
   sending the data from the transmit/receive buffer through the network interface controller to a network connected thereto; and
   retransmitting the data from the retransmit buffer by the retransmit direct memory access to the network without access to the user buffer.

2. The method as claimed in claim 1 wherein operating the retransmit direct memory access includes moving the data to the network with a single access of a bus having an access to the user buffer.

3. The method as claimed in claim 1 further comprising operating a transfer controller in the retransmit direct memory access for managing the copying of the data.

4. The method as claimed in claim 1 wherein retransmitting the data includes responding to a network time-out during the sending of the data.

5. The method as claimed in claim 1 wherein operating the retransmit direct memory access for moving the data between a user buffer and a network interface controller includes:
   moving the data into the retransmit buffer, wherein the retransmit buffer is located in the network interface controller;
   moving the data into the retransmit buffer, wherein the retransmit buffer is located in a computer system memory; or
   moving the data into the retransmit buffer, wherein the retransmit buffer is located in both the network interface controller and the computer system memory.

6. A method for operating a computer system comprising:
   operating a retransmit direct memory access for moving data between user buffer and a network interface controller, wherein the retransmit direct memory access copies the data from a user buffer to a retransmit buffer;
   releasing the user buffer when the message is sent to the network;
   re-using the user buffer for other data;
   sending the data from the network interface controller to the network;
   retransmitting the data from the retransmit buffer by the retransmit direct memory access to the network without access to the user buffer.

7. The method as claimed in claim 6 wherein the operating the retransmit direct memory access includes:
   moving the data to the network with a single access of a bus having an access to the user buffer; and
   coordinating the moving of the data to a transmit/receive buffer and the retransmit buffer in the network interface controller.

8. The method as claimed in claim 6 further comprising operating a transfer controller in the retransmit direct memory access includes:
   managing an address signal and a control signal for accessing the data; and
   managing the moving of the data.

9. The method as claimed in claim 6 wherein retransmitting the data includes:
   responding to a network time-out during the sending of the data; and
   retransmitting the data from the retransmit buffer.

10. The method as claimed in claim 6 wherein operating the retransmit direct memory access for moving the data between a user buffer and a network interface controller includes:
    moving the data into the retransmit buffer by the retransmit direct memory access, wherein the retransmit buffer is located in the network interface controller;
    moving the data into the retransmit buffer by the retransmit direct memory access, wherein the retransmit buffer is located in a computer system memory; or
    moving the data into the retransmit buffer by the retransmit direct memory, wherein the retransmit buffer is located in both the network interface controller and the computer system memory.

11. A computer system comprising:
    a computer having a bus coupled to a computer system memory with a user buffer allocated therein;
    a network interface controller coupled between the bus and a network; and
    a retransmit buffer coupled to the computer system memory;
    a transmit/receive buffer coupled to the computer system memory;
    a retransmit direct memory access within the network interface controller for moving data between the user buffer and the transmit/receive buffer, the retransmit buffer, or both as well as for moving the data to the network.

12. The system as claimed in claim 11 wherein the network interface controller includes a network interface control processor for setting up the retransmit direct memory access for copying the data to a transmit buffer.

13. The system as claimed in claim 11 wherein the retransmit direct memory access comprises:
    a transfer controller;
    a transmit buffer logic coupled to the transfer controller;
    a retransmit buffer logic coupled to the transfer controller;
    a processor control logic for independent accessing to the transmit buffer logic and the retransmit buffer logic; and
    a bus interface logic coupled to the transfer controller for concurrent accessing to the transmit buffer logic and the retransmit buffer logic.

14. The system as claimed in claim 11 wherein the network interface controller includes a bus interface coupled to the retransmit direct memory access for writing the same data to the retransmit buffer and the transmit buffer.

15. The system as claimed in claim 11 further comprising a command buffer coupled to the retransmit direct memory access.

16. The system as claimed in claim 11 wherein:
    the bus is a front side bus or a peripheral control interface; and
    the network is coupled to a remote network interface controller.

17. The system as claimed in claim 16 further comprising a command buffer in the network interface controlled coupled to the retransmit direct memory access.

18. The system as claimed in claim 16 wherein the retransmit direct memory access comprises:
    a transfer controller for managing an address signal and a control signal;
    a transmit buffer in the network interface controller;

a transmit buffer logic, coupled to the transfer controller, having the address signal and the control signal to the transmit buffer;
a retransmit buffer in the network interface controller;
a retransmit buffer logic, coupled to the transfer controller, having the address signal and the control signal to the retransmit buffer;
a processor control logic for independent accessing the transmit buffer logic and the retransmit buffer logic in which the transmit buffer is in the network interface controller and the retransmit buffer is in the computer system memory; and
a bus interface logic coupled to the transfer controller for concurrent accessing the transmit buffer logic and the retransmit buffer logic with concurrent access to the network interface controller and the computer system memory.

19. The system as claimed in claim 16 further comprising a bus interface coupled to the retransmit direct memory access includes the retransmit buffer and the transmit buffer having the same data includes with the transmit buffer in the network interface controller and the retransmit buffer in the network interface controller, the computer system memory, or a combination thereof.

20. The system as claimed in claim 16 further comprising:
a command buffer coupled to the retransmit direct memory access; and
a network interface control processor coupled to the command buffer and the retransmit direct memory access.

* * * * *

UNITED STATES PATENT AND TRADEMARK OFFICE
CERTIFICATE OF CORRECTION

PATENT NO.         : 7,788,437 B2
APPLICATION NO.    : 11/553970
DATED              : August 31, 2010
INVENTOR(S)        : Michael S. Schlansker et al.

It is certified that error appears in the above-identified patent and that said Letters Patent is hereby corrected as shown below:

In column 11, line 50, in Claim 6, after "network;" insert -- and --.

Signed and Sealed this
Third Day of July, 2012

David J. Kappos
*Director of the United States Patent and Trademark Office*